Patented Sept. 19, 1939

2,173,471

UNITED STATES PATENT OFFICE 2,173,471

HYDROXYALKYLATION OF CELLULOSES

Aubrey Ernest Broderick, South Charleston, W. Va., assignor to Carbide and Carbon Chemicals Corporation, a corporation of New York No Drawing. Application August 24, 1938.
Serial No. 226,428

11 Claims. (Cl. 260—231)

This invention relates to the production of industrially valuable hydroxyalkyl ethers of celluloses; and more especially it concerns a process for the preparation of such cellulose ethers that are especially suitable for subsequent esterification with organic acid anhydrides, although the process also is applicable to the preparation of hydroxyalkyl celluloses which subsequently are readily peptizable in dilute (6 to 8%) solutions of caustic soda to produce compositions useful in the preparation of films, filaments, and for coating and impregnating various articles.

Heretofore in producing hydroxyalkyl celluloses, and particularly when preparing the same in a form in which they are soluble to some extent in caustic soda, it has been customary to etherify with an alkylene oxide or chlorhydrin an alkali cellulose or a mercerized cellulose—that is, a cellulose that has been steeped in a caustic soda solution of mercerizing strength (18 to 30% caustic soda), pressed out to a certain wet weight, and shredded to a low density. The shredded alkali cellulose may be degraded by exposure to atmospheric oxygen over a selected period of time, especially in the presence of caustic soda. Hydrocellulose, known in the textile industry as "mercerized cellulose", results upon neutralization of the caustic soda present in the alkali cellulose. Alkali cellulose and mercerized cellulose differ from the original cellulose in being more reactive and more hydrophyllic; and the ratios of the wet strengths of fibres of the two former celluloses to their dry strengths are much lower than the ratio of the wet and dry strengths of the original cellulose from which the two former were produced.

The present invention is based in important part upon applicant's discovery that cellulose pulps that are substantially unmercerized and are free from alkali cellulose may be converted into hydroxyalkyl celluloses that are readily esterified by the usual esterification processes; and that certain of these ethers may be dissolved in dilute solutions of caustic soda to yield compositions useful in the production of films, filaments, and the like having higher wet and dry strengths than those formed from hydroxyalkyl celluloses derived from soda cellulose and mercerized cellulose.

According to the present invention, a mixture of water and an unmercerized cellulose or derivative thereof free from alkali cellulose, and containing between 35% and 60% by weight of water, may be reacted with between around 7.5% and around 30%—and generally with between 8% and 25%—of the dry weight of the cellulose or with vaporous ethylene oxide, propylene oxide, or with both of these oxides concurrently, in a closed system substantially free from air or other oxygen-containing fluid. Reaction temperatures ranging from atmospheric temperature to 60° C. are employed; and those ranging from 45° to 60° C. are particularly efficacious. Temperatures above 60° C. unduly accelerate the resinification of aldehydes that are formed from the alkylene oxide. When ethylene oxide is used, the reaction temperature should not exceed 50° C., and temperatures between 45° and 50° C. are preferred. When using propylene oxide, temperatures as high as 55° to 60° C. may be used, since this oxide is more resistant than ethylene oxide to aldehyde formation and resinification of the latter at high temperatures. The hydroxyalkylation preferably is conducted under atmospheric pressure or less, though low superatmospheric pressures, such as 5 or 6 pounds per square inch, gauge, may exist for short periods. Preferably the hydroxyalkylation is conducted in the presence of between 0.5% and 8.0% of a water-soluble catalyst. While caustic soda is the preferred catalyst, caustic potash; a tertiary amine such as trimethylamine or other trialkylamine; or pyridine may effectively be used.

The invention has special utility for the production of hydroxyalkylated celluloses substantially free from water-insoluble resinous materials, the only impurities being small amounts of the water-soluble catalyst and, in certain cases, some water-soluble hydroxyalkyl derivatives of the low polymer fractions of the cellulose—especially in the case of wood pulps. These are readily extracted with water; and no peptization of the cellulose material occurs even without neutralization of the alkaline catalyst. Thus their purification is very simple; and the fibre structure and degree of polymerization of the original cellulose are fully preserved. In fact, especially in the case of the wood pulps, the average degree of polymerization of the purified cellulose ether actually may be greater than that of the original cellulose, due to removal of water-soluble hemicellulose derivatives.

The invention is especially adapted for the hydroxy-alkylation of such refined unmercerized celluloses as cotton linters, alpha wood pulp, sulphite wood pulp and soda wood pulp; and of partially alkylated and benzylated celluloses insoluble in aqueous caustic alkali solutions.

The process also is applicable for the production of hydroxyalkyl celluloses that subsequently are readily peptizable in dilute caustic soda solutions, in which case the cellulose used is previously depolymerized by any of the usual procedures, such as by a mild treatment with either dilute caustic soda or a dilute mineral acid to reduce its solution viscosity, followed by washing and neutralization steps to remove the alkali or acid. Such depolymerization is necessary since neither the hydroxyalkylation of the invention nor the subsequent purification step causes substantial depolymerization of the cellulose. The hydroxyalkylated cellulose may be washed free from water-soluble catalyst and peptized immediately after its production; it may be stored and shipped in the wet condition if preferred; or it may be dried and stored or shipped in the dry condition either as dense sheets or in fluffy fibrous form.

In practicing the invention according to a preferred modification, the unmercerized cellulose is disintegrated by mechanical shredders in the presence of the water to be present during the hydroxyalkylation, thereby securing a uniform distribution of the water and catalyst throughout the cellulose. Preferably the catalyst used is dissolved in this water, although it conveniently may be added to the cellulose during the shredding, either in pure form or as a concentrated aqueous solution. In instances where an amine such as trimethylamine is used, the same may be added in toto as a gas just prior to the etherification; gradually during the etherification conjointly with the gaseous alkylene oxide; or in toto just after the addition of the initial portion of the alkylene oxide gas.

For hydroxyalkylating the shredded cellulose material, the same is introduced into a closed fluid-tight vessel provided with means for heating and for agitating the said material. A rotatable water-jacketed autoclave conveniently may be used. The vessel and contents first are evacuated to remove most or substantially all of the air. Thereafter the selected amount of alkylene oxide is introduced at a slow regulated rate into the cellulose material during agitation of the latter. The substantial absence of air prevents dilution of the oxide and appreciable formation of oxycellulose in the presence of the catalyst. The maximum amount of unreacted alkylene oxide vapor present in contact with the cellulose material at any instant is low. In the case of ethylene oxide, in operations conducted around atmospheric pressure and at temperatures around 50° C., about 3% of the unreacted oxide is in contact with the cellulose at any given time, based upon the weight of the cellulose. In operations at lower pressures, this proportion of unreacted oxide may be still lower.

The rate of feeding the alkylene oxide is so regulated that the pressure during the hydroxyalkylation seldom or never substantially exceeds atmospheric, and never exceeds around 5 to 6 pounds per square inch, gauge. After addition of the last of the alkylene oxide vapor, the subatmospheric pressure attained by the initial evacuation is approximately regained, indicating completion of the reaction. The resultant product is then extracted with water and centrifuged. It may then be dried, or stored in the wet state for subsequent use.

This invention makes possible the continuous production of hydroxyalkyl celluloses of uniform low alkylene oxide content and selected properties by a process insuring the maximum rate of reaction consistent with the minimum degree of aldehyde resinification. No depolymerization of the cellulose occurs even when caustic soda is used as catalyst. The process has the important operating advantage that it is susceptible to accurate control by the operator. Since pressure no higher than atmospheric preferably are used, operating hazards from alkylene oxide vapor leakage are eliminated.

When employing cotton linters and the usual commercial grades of wood pulp as starting materials, no substantial amount of peptization of the resultant product occurs even on freezing the suspension of the hydroxyalkyl cellulose in 6% to 8% aqueous solutions of caustic soda. However, in instances where the cellulose used has been suitably, even mildly depolymerized prior to the etherification, the product obtained, while not being substantially peptized at ordinary temperatures, may be peptized more or less completely upon mixing it with a 6% to 8% solution of caustic soda, freezing the mixture at temperatures around −4° to −8° C., while vigorously agitating the same, and subsequently thawing the agitated mixture, whereby solutions of around 8.5% of the ether in the said caustic soda solution are secured.

The slight depolymerization mentioned may be produced, for example, by the usual treatment of cotton linters for removal of waxes, or the treatment of wood pulp for removal of lignin, resins and xylans.

The properties possessed by the hydroxyalkyl celluloses are dependent both upon the degree of depolymerization of the original cellulose, and upon the conditions of the hydroxyalkylation and the amount of alkylene oxide or its equivalent used in the hydroxyalkylation. Most commercial types of cellulose, even when combined with as much as 25% by weight of alkylene oxide, are not completely soluble in 6% to 8% solutions of caustic soda, even after freezing the mixture.

For most uses it is highly desirable that both the wet strength and dry strength of films and filaments of hydroxyalkyl celluloses be as high as possible. In general, the wet strengths of such films and filaments are inversely proportional to the alkylene oxide content of the cellulose ether from which they are fabricated. However, it has now been determined that hydroxyalkyl celluloses having combined therewith less than 8% of an alkylene oxide yield films and filaments possessing unsatisfactory wet and dry strengths, even when the cellulose had been but slightly depolymerized.

Hydroxyalkyl celluloses such as hydroxyethyl and hydroxypropyl cellulose containing between 7.5% and 30% by weight of the alkylene oxide and derived from a depolymerized unmercerized cellulose free from alkali cellulose are readily peptized or at least are peptized sufficiently for filtration at an industrially practicable rate by freezing a slurry or mixture containing the hydroxyalkyl cellulose in a 6% to 8% aqueous solution of caustic soda at a temperature between around −4° and −8° C., while agitating the mixture. If the freezing is not accompanied by agitation of the mixture, satisfactory or substantially complete peptization of the cellulose either is only effected at lower temperatures, around −14° to around −20° C.

The following examples serve to illustrate the invention:

*Example 1*

Twenty pounds (dry basis) of viscose rayon grade of sulphite wood pulp containing 7.4% of moisture were shredded with 26.4 pounds of water in which was dissolved .41 pound of caustic soda. The fluffy moist cellulose was placed in a closed fluid-tight container which was then evacuated. Then 4.5 pounds of ethylene oxide vapor (about 22.5% of the dry weight of the pulp) were slowly introduced over a period of 7 hours while agitating the mass. During this time the pressure within the vessel did not exceed atmospheric; and for much of this time a subatmospheric pressure corresponding to 26 to 28 inches of mercury was maintained. A constant temperature of 54° C. was maintained in the vessel during the entire reaction period. When the reaction was complete, as shown by return of the pressure within the vessel to that attained by the evacuation, the resultant fibrous cellulose ether was discharged and washed on a copper wire screen with water at 78° C. until free from caustic soda and water-soluble derivatives of hemicelluloses. It then was centrifuged to a weight of 56.3 pounds, providing a net yield of 20.6 pounds of hydroxyethyl cellulose. When dried or when dehydrated by extraction with glacial acetic acid, it was readily acetylated by known methods either to form the secondary acetone-soluble acetate or the fibrous primary triacetate. It was not susceptible to appreciable peptization in dilute caustic soda solutions.

Example 2

Twenty pounds of cotton linters (dry basis) containing 6.7% of moisture, free from extraneous matter and washed and dewaxed as by boiling with a dilute aqueous solution of a mixture of caustic soda and sodium carbonate, were shredded in the presence of 0.49 pound of caustic soda dissolved in 27.1 pounds of water. Then, following the general procedure described in Example 1, 4.0 pounds of propylene oxide vapor (about 20% of the weight of the dry linters) were slowly reacted with the cellulose over a period of 7 hours. The final product was centrifuged to a weight of 44.3 pounds, and contained 21.1 pounds of dry hydroxypropyl cellulose. This product was very readily acetylated by the usual methods, but could not be appreciably peptized in dilute caustic soda solutions by known methods.

Example 3

Twenty pounds of spruce wood pulp (dry basis) containing 16.7% of moisture, which had been treated with a dilute solution of caustic soda to lower its solution viscosity and partially depolymerize it, followed by a washing with water and neutralization, were shredded in the presence of 0.32 pound of caustic soda dissolved in 25.0 pounds of water. Thereafter, following the procedure recited in Example 1, 4.0 pounds of ethylene oxide (about 20% of the dry weight of the pulp) were slowly added to and reacted with the cellulose during 7 hours. The resultant product was washed with water and centrifuged to a weight of 53.3 pounds containing 22.3 pounds of hydroxyethyl cellulose (dry basis). This product was readily peptized in a 7% solution of caustic soda to a fibre-free viscous syrupy dope by freezing. The hydroxyethyl cellulose was mixed with the 7% caustic soda solution to give a slurry containing 8.5% of the hydroxyethyl cellulose, 6.4% caustic soda and 85.1% of water by weight. The slurry was cooled in a thin layer to around −14° to −20° C. When frozen solid the cake was broken up into small pieces and agitated while thawing. Another and preferred procedure, especially adapted for handling large volumes of the slurry, involves mixing and agitating the slurry in a mixer of the Werner-Pfleiderer type while passing cooling brine through the mixer jacket until the slurry is cooled to around −4° to −8° C., at which crystals begin to appear. The thick slush then is permitted to thaw, whereupon a filterable solution is obtained.

Example 4

Twenty pounds (dry basis) of the depolymerized spruce wood pulp recited in Example 3 were shredded in the presence of a solution of 0.6 pound of pyridine in 26.0 pounds of water. Then, following the procedure recited in Example 1, 5.25 pounds of propylene oxide vapor were slowly added to and reacted for about 7 hours with the cellulose. The resultant product was washed with water and centrifuged to a weight of 55.1 pounds, including 22.1 pounds of hydroxypropyl cellulose (dry basis). It was readily peptized in a 7% solution of caustic soda to a fibre-free dope by freezing under the conditions described in Example 3.

Example 5

Four pounds of the depolymerized spruce wood pulp (dry basis) recited in Example 3, together with 6.0 pounds of water were placed in a small rotatable autoclave which was then evacuated. Ethylene oxide vapors were then slowly flowed into the autoclave during 11 hours while agitating the mixture by rotating the autoclave, and while maintaining the mixture at 50° C. After atmospheric pressure again had been approximately attained in the autoclave, 0.08 pound of trimethylamine gas was introduced, whereupon the ethylene oxide readily reacted with the cellulose. After 0.8 pound of ethylene oxide had reacted (about 20% of the dry weight of the pulp), the introduction thereof was discontinued. The resultant product was washed with water and centrifuged to remove excess liquid. The residual hydroxyethyl cellulose was readily peptizable in a 7% solution of caustic soda by freezing the mixture in the manner described in Example 3.

Example 6

To 5.5 pounds of air-dry aged commercial alpha pulp were added 6 pounds of an aqueous mixture of water and pyridine containing 0.14 pound of the latter. The mixture was shredded for 1 hour to insure uniform mixture. The fluffed wet cellulose then was placed in a fluid-tight vessel, evacuated, and 0.92 pound of ethylene oxide vapors (around 18.4% of the dry weight of the pulp) was slowly introduced during 11 hours. The temperature was held at 50° C. and a reaction between the cellulose and ethylene oxide occurred under these mild, readily controlled conditions. The gross weight of the resultant product was 12.35 pounds. The yield of cellulose ether (dry basis) was 5.43 pounds. The product was purified by extraction with hot water in the usual way. The wet cellulose ether was then mixed with a solution of 4.32 pounds of caustic soda and 58.25 pounds of water, placed in shallow pans and frozen at −20° C. It was then thawed, filtered, and converted to transparent sheeting.

The term "unmercerized cellulose" is employed in the specification and claims to designate a cellulose or partially etherified cellulose which has not been treated with caustic soda of mercerizing strength to an extent where substantial mercerization of the fibre is effected.

The invention is susceptible of modulation within the scope of the appended claims.

I claim:

1. Process for producing an hydroxyalkyl ether of cellulose, which comprises reacting a vaporous alkylene oxide with a mixture of an unmercerized cellulose and water containing between 35% and 60% of the latter, in the presence of between 0.5% and 8% of an etherification catalyst, while maintaining the reaction mixture at a temperature between atmospheric and 60° C., and under a pressure not substantially greater than around 6 pounds per square inch, in the substantial absence of air.

2. Process as defined in claim 1 wherein between about 7.5% and about 30% of the alkylene oxide, based on the dry weight of the cellulose, is reacted with the unmercerized cellulose.

3. Process as defined in claim 1 wherein the said cellulose is selected from the group of refined unmercerized celluloses consisting of cotton linters, alpha wood pulp, sulphite wood pulp, soda wood pulp, and partially alkylated and benzylated celluloses insoluble in 6% to 8% aqueous solutions of caustic soda.

4. Process for producing an hydroxyalkyl ether of cellulose, which comprises slowly introducing successive portions of an hydroxyalkylating agent into an agitated mixture containing between 40% and 65% of unmercerized fibrous cellulose in admixture with water within a vacuumized zone, in the presence of not more than 8% of an alkaline etherification catalyst, the hydroxyalkylating agent being introduced at a rate preventing the pressure within said zone from rising substantially above a few pounds per square inch, gauge, during the reaction maintaining the reaction mixture at a temperature between atmospheric and 60° C., and recovering from the resultant reaction mixture the hydroxyalkyl cellulose thus produced.

5. Process as defined in claim 4 wherein the said hydroxyalkylating agent consists of at least one alkylene oxide selected from the group consisting of ethylene oxide and propylene oxide.

6. Process as defined in claim 4 wherein the said agent is introduced into the said mixture of unmercerized cellulose and water, in the presence of between 0.5% and 5.0% of caustic soda.

7. Process as defined in claim 4 wherein, during the etherification reaction, the reaction mixture is maintained at a temperature between 45° and 60° C.

8. Process as defined in claim 4 wherein the total amount of the hydroxyalkylating agent introduced into the unmercerized cellulose is within the range between around 7.5% and around 30% of the dry weight of the cellulose.

9. Process as defined in claim 4 wherein the total amount of the hydroxyalkylating agent present in the resultant hydroxyalkyl cellulose produced ranges between around 7.5% and around 25% of the dry weight of the latter.

10. Process as defined in claim 4 wherein the unmercerized fibrous cellulose starting material previously has been at least partially depolymerized by a mild depolymerization treatment with dilute caustic alkali or dilute mineral acid.

11. Process for producing an hydroxyalkyl ether of unmercerized cellulose, which comprises reacting at least one vaporous alkylene oxide with a mixture containing between 40% and 65% of an unmercerized cellulose admixed with water, in the presence of between 0.5% and 8% of a water-soluble etherification catalyst and in the substantial absence of air, while maintaining the reaction mixture at a temperature between atmospheric and around 60° C., and under a pressure not substantially higher than atmospheric, and limiting the amount of the alkylene oxide reacted with the cellulose to between 8% and 25% of the dry weight of the cellulose, separating from the resultant reaction mixture the hydroxyalkyl cel.ulose thus produced, freezing a mixture of the latter in a 6% to 8% solution of caustic soda while agitating the said mixture, and subsequently thawing the mixture while continuing the agitation thereof, whereby at least around 8% of the said hydroxyalkyl cellulose is rendered soluble in the last-named caustic soda solution.

AUBREY ERNEST BRODERICK.

---

CERTIFICATE OF CORRECTION.

Patent No. 2,173,471.

September 19, 1939.

AUBREY ERNEST BRODERICK.

It is hereby certified that error appears in the printed specification of the above numbered patent requiring correction as follows: Page 2, second column, line 68, for the word "either" read ether; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.

I claim:

1. Process for producing an hydroxyalkyl ether of cellulose, which comprises reacting a vaporous alkylene oxide with a mixture of an unmercerized cellulose and water containing between 35% and 60% of the latter, in the presence of between 0.5% and 8% of an etherification catalyst, while maintaining the reaction mixture at a temperature between atmospheric and 60° C., and under a pressure not substantially greater than around 6 pounds per square inch, in the substantial absence of air.

2. Process as defined in claim 1 wherein between about 7.5% and about 30% of the alkylene oxide, based on the dry weight of the cellulose, is reacted with the unmercerized cellulose.

3. Process as defined in claim 1 wherein the said cellulose is selected from the group of refined unmercerized celluloses consisting of cotton linters, alpha wood pulp, sulphite wood pulp, soda wood pulp, and partially alkylated and benzylated celluloses insoluble in 6% to 8% aqueous solutions of caustic soda.

4. Process for producing an hydroxyalkyl ether of cellulose, which comprises slowly introducing successive portions of an hydroxyalkylating agent into an agitated mixture containing between 40% and 65% of unmercerized fibrous cellulose in admixture with water within a vacuumized zone, in the presence of not more than 8% of an alkaline etherification catalyst, the hydroxyalkylating agent being introduced at a rate preventing the pressure within said zone from rising substantially above a few pounds per square inch, gauge, during the reaction maintaining the reaction mixture at a temperature between atmospheric and 60° C., and recovering from the resultant reaction mixture the hydroxyalkyl cellulose thus produced.

5. Process as defined in claim 4 wherein the said hydroxyalkylating agent consists of at least one alkylene oxide selected from the group consisting of ethylene oxide and propylene oxide.

6. Process as defined in claim 4 wherein the said agent is introduced into the said mixture of unmercerized cellulose and water, in the presence of between 0.5% and 5.0% of caustic soda.

7. Process as defined in claim 4 wherein, during the etherification reaction, the reaction mixture is maintained at a temperature between 45° and 60° C.

8. Process as defined in claim 4 wherein the total amount of the hydroxyalkylating agent introduced into the unmercerized cellulose is within the range between around 7.5% and around 30% of the dry weight of the cellulose.

9. Process as defined in claim 4 wherein the total amount of the hydroxyalkylating agent present in the resultant hydroxyalkyl cellulose produced ranges between around 7.5% and around 25% of the dry weight of the latter.

10. Process as defined in claim 4 wherein the unmercerized fibrous cellulose starting material previously has been at least partially depolymerized by a mild depolymerization treatment with dilute caustic alkali or dilute mineral acid.

11. Process for producing an hydroxyalkyl ether of unmercerized cellulose, which comprises reacting at least one vaporous alkylene oxide with a mixture containing between 40% and 65% of an unmercerized cellulose admixed with water, in the presence of between 0.5% and 8% of a water-soluble etherification catalyst and in the substantial absence of air, while maintaining the reaction mixture at a temperature between atmospheric and around 60° C., and under a pressure not substantially higher than atmospheric, and limiting the amount of the alkylene oxide reacted with the cellulose to between 8% and 25% of the dry weight of the cellulose, separating from the resultant reaction mixture the hydroxyalkyl cellulose thus produced, freezing a mixture of the latter in a 6% to 8% solution of caustic soda while agitating the said mixture, and subsequently thawing the mixture while continuing the agitation thereof, whereby at least around 8% of the said hydroxyalkyl cellulose is rendered soluble in the last-named caustic soda solution.

AUBREY ERNEST BRODERICK.

---

CERTIFICATE OF CORRECTION.

Patent No. 2,173,471.    September 19, 1939.

AUBREY ERNEST BRODERICK.

It is hereby certified that error appears in the printed specification of the above numbered patent requiring correction as follows: Page 2, second column, line 68, for the word "either" read ether; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.